(12) United States Patent
Brotherton et al.

(10) Patent No.: US 11,533,339 B2
(45) Date of Patent: *Dec. 20, 2022

(54) CREATING SECURITY INCIDENT RECORDS USING A REMOTE NETWORK MANAGEMENT PLATFORM

(71) Applicant: ServiceNow, Inc., Santa Clara, CA (US)

(72) Inventors: Thomas Woodley Brotherton, Temecula, CA (US); Vamsi Krishna Madala, San Diego, CA (US); Teja Chava, San Diego, CA (US); John Gerald Ferguson, San Francisco, CA (US); Hnin Haymar, San Diego, CA (US); Betsy Cherian, Poway, CA (US); Eun-Sook Watson, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 17/080,450

(22) Filed: Oct. 26, 2020

(65) Prior Publication Data

US 2021/0058431 A1 Feb. 25, 2021

Related U.S. Application Data

(63) Continuation of application No. 16/100,464, filed on Aug. 10, 2018, now Pat. No. 10,826,942.

(51) Int. Cl.
*H04L 29/00* (2006.01)
*H04L 9/40* (2022.01)
(Continued)

(52) U.S. Cl.
CPC .............. *H04L 63/20* (2013.01); *H04L 63/02* (2013.01); *H04L 67/10* (2013.01); *H04L 67/53* (2022.05);
(Continued)

(58) Field of Classification Search
CPC ......... H04L 63/20; H04L 63/02; H04L 67/10; H04L 67/20; H04L 63/0272; H04L 63/0281; H04L 63/1416; H04L 67/53
See application file for complete search history.

(56) References Cited

U.S. PATENT DOCUMENTS

| 6,609,122 B1 | 8/2003 | Ensor |
| 6,678,887 B1 | 1/2004 | Hallman |

(Continued)

OTHER PUBLICATIONS

Computer Security Incident Handling Guide: Recommendations of the National Institute of Standards and Technology. NIST, Special Publication 800-61 Revision 2. Internet Access: http://dx.doi.org/10.6028/NIST.SP.800-61r2. Published Aug. 2012. 79 pages. (Year: 2012).*

(Continued)

*Primary Examiner* — Don G Zhao
(74) *Attorney, Agent, or Firm* — Fletcher Yoder PC

(57) ABSTRACT

An example embodiment performed by a scoped software application executable on a computing device of a computational instance of a remote network management platform may involve: requesting and receiving, from an application database associated with a third-party software application, alert rules that trigger alerts when associated events occur in a managed network; receiving data representing selection of a set of the alert rules and, based on the data, requesting and receiving, from the application database, a set of past alerts that have been triggered by the set of the alert rules; using mapping data to map fields of the set of the past alerts to fields of a sample security incident record; displaying a (Continued)

preview region including the sample security incident record; using the mapping data to create security incident records that map to the set of past alerts; and writing, to a security incident database, the security incident records.

20 Claims, 14 Drawing Sheets

(51) Int. Cl.
*H04L 67/10* (2022.01)
*H04L 67/53* (2022.01)

(52) U.S. Cl.
CPC ...... *H04L 63/0272* (2013.01); *H04L 63/0281* (2013.01)

(56) References Cited

U.S. PATENT DOCUMENTS

| | | | |
|---|---|---|---|
| 7,020,706 B2 | 3/2006 | Cates | |
| 7,028,301 B2 | 4/2006 | Ding | |
| 7,062,683 B2 * | 6/2006 | Warpenburg | G06F 11/0718 714/E11.026 |
| 7,131,037 B1 * | 10/2006 | LeFaive | H04L 41/0631 714/46 |
| 7,170,864 B2 | 1/2007 | Matharu | |
| 7,350,209 B2 | 3/2008 | Shum | |
| 7,610,512 B2 | 10/2009 | Gerber | |
| 7,617,073 B2 * | 11/2009 | Trinon | G06F 11/324 702/186 |
| 7,640,506 B2 * | 12/2009 | Pratley | G06Q 10/10 715/751 |
| 7,653,633 B2 * | 1/2010 | Villella | G06F 11/3476 707/648 |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,930,396 B2 * | 4/2011 | Trinon | G06Q 10/063 709/224 |
| 7,945,860 B2 | 5/2011 | Vambenepe | |
| 7,966,398 B2 | 6/2011 | Wiles | |
| 8,032,489 B2 | 10/2011 | Villella et al. | |
| 8,051,164 B2 | 11/2011 | Peuter | |
| 8,224,683 B2 | 7/2012 | Manos | |
| 8,266,096 B2 | 9/2012 | Navarrete | |
| 8,301,701 B2 * | 10/2012 | Goodman | H04L 63/104 709/206 |
| 8,402,127 B2 | 3/2013 | Solin | |
| 8,457,928 B2 | 6/2013 | Dang | |
| 8,478,569 B2 * | 7/2013 | Scarpelli | G06F 11/3409 702/182 |
| 8,543,694 B2 * | 9/2013 | Petersen | H04L 41/069 709/224 |
| 8,612,408 B2 | 12/2013 | Trinon | |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 8,983,982 B2 | 3/2015 | Rangarajan | |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,317,327 B2 | 4/2016 | Apte | |
| 9,363,252 B2 | 6/2016 | Mueller | |
| 9,508,051 B2 | 11/2016 | Falk | |
| 9,535,674 B2 | 1/2017 | Cooper | |
| 9,535,737 B2 | 1/2017 | Joy | |
| 9,557,969 B2 | 1/2017 | Sharma | |
| 9,645,833 B2 | 4/2017 | Mueller | |
| 9,654,473 B2 | 5/2017 | Miller | |
| 9,766,835 B2 | 9/2017 | Kelkar | |
| 9,792,387 B2 | 10/2017 | George | |
| 9,805,322 B2 | 10/2017 | Kelkar | |
| 10,142,205 B2 * | 11/2018 | Balasubramanian | H04L 41/065 |
| 10,826,942 B2 * | 11/2020 | Brotherton | H04L 63/1416 |
| 2012/0246303 A1 * | 9/2012 | Petersen | G06F 16/1734 709/224 |
| 2014/0330969 A1 * | 11/2014 | Duby | H04L 65/1069 709/225 |
| 2015/0128211 A1 * | 5/2015 | Kirner | H04L 63/104 726/1 |
| 2015/0294244 A1 * | 10/2015 | Bade | G06Q 10/063 705/7.11 |
| 2016/0301570 A1 * | 10/2016 | Meyer | H04L 41/0816 |
| 2017/0026418 A1 * | 1/2017 | Kirner | H04L 63/10 |
| 2017/0104652 A1 | 4/2017 | Balssubramanian | |
| 2017/0289182 A1 * | 10/2017 | Cifarelli | G06F 16/24578 |

OTHER PUBLICATIONS

Greg Foss, "How to Make Your SIEM Speak", Aug. 8, 2017.

* cited by examiner

Alert Profile
my profile

| Name | Alert Rule Selection | Mapping | Preview | Scheduling & Alert Retrieval |

You may pull historical alert data as well as configure a polling interval to receive incremental alerts on a scheduled basis that match the configured alert filtering.

☑ Ongoing Alert Ingestion Polling
Retrieve incremental alerts every [5] minutes

☐ Historical Alert Retrieval
○ Since the following date
○ Receive specific alert based on AlertID
For ex: 123,567,890,1460

FIG. 7F

CREATING SECURITY INCIDENT RECORDS USING A REMOTE NETWORK MANAGEMENT PLATFORM

CROSS REFERENCE TO RELATED APPLICATIONS

The present disclosure is a continuation of U.S. patent application Ser. No. 16/100,464, filed Aug. 10, 2018, the entirety of which is incorporated by reference into the present disclosure.

BACKGROUND

A remote network management platform may take the form of a hosted environment that provides an application Platform-as-a-Service (aPaaS) to users, particularly to operators of a managed network such as an enterprise. This may take the form of web-based portals and/or software applications that enterprises or other entities (as well as both internal and external users thereof) may access through computational instances of the remote network management platform.

One such service that the remote network management can provide is a security operations service through which the enterprise can manage security incidents that occur in the managed network and assess risk involved as appropriate. Security incidents can have varying severity, such as spam, unauthorized access attempts, malicious software, and phishing.

SUMMARY

The present disclosure provides an improvement to a remote network management platform that integrates security services provided to an enterprise's managed network by a third-party with security services provided to the managed network by the remote network management platform. In particular, the remote network management platform can provide a software application, such as a variant of a security operations application, that is configured to enable the enterprise to pull, from a database associated with the third-party's security services, past alerts that have been triggered due to events in the managed network. The software application can then use mapping data to map fields that exist on the third-party side to corresponding fields defined in accordance with the security services of the remote network management platform and create security incident records from the past alerts.

Accordingly, a first example embodiment may involve requesting and receiving, by a scoped software application, from an application database associated with a third-party software application, alert rules that trigger alerts when associated events occur in a managed network. The scoped software application may be executable on a computing device of a computational instance of a remote network management platform. The computational instance may be communicatively coupled and dedicated to the managed network and may contain a security incident database. The managed network may contain one or more servers and the application database. The third-party software application may be executable on the one or more servers. The application database may store, in fields defined in accordance with the third-party software application: (i) the alert rules and (ii) past alerts that have been triggered by the alert rules. The first example embodiment may also involve receiving, by the scoped software application, input data representing selection of a set of the alert rules. The first example embodiment may also involve, based on the input data, requesting and receiving, by the scoped software application, from the application database, a set of the past alerts that have been triggered by the set of the alert rules. The first example embodiment may also involve, using mapping data stored within the computational instance, mapping, by the scoped software application, fields of the set of the past alerts to fields of a sample security incident record without writing the sample security incident record to the security incident database. The mapping data may define pairwise associations between the fields of the set of the past alerts and fields of the security incident records. The first example embodiment may also involve generating and providing for display, by the scoped software application, a representation of a graphical user interface, the representation comprising a preview region including the sample security incident record. The first example embodiment may also involve, using the mapping data, creating, by the scoped software application, security incident records that map to the set of the past alerts. The first example embodiment may also involve writing, by the scoped software application, to the security incident database, the security incident records.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7B illustrates a GUI, in accordance with example embodiments.

FIG. 7C illustrates a GUI, in accordance with example embodiments.

FIG. 7D illustrates a GUI, in accordance with example embodiments.

FIG. 7E illustrates a GUI, in accordance with example embodiments.

FIG. 7F illustrates a GUI, in accordance with example embodiments.

DETAILED DESCRIPTION

Figure 1:
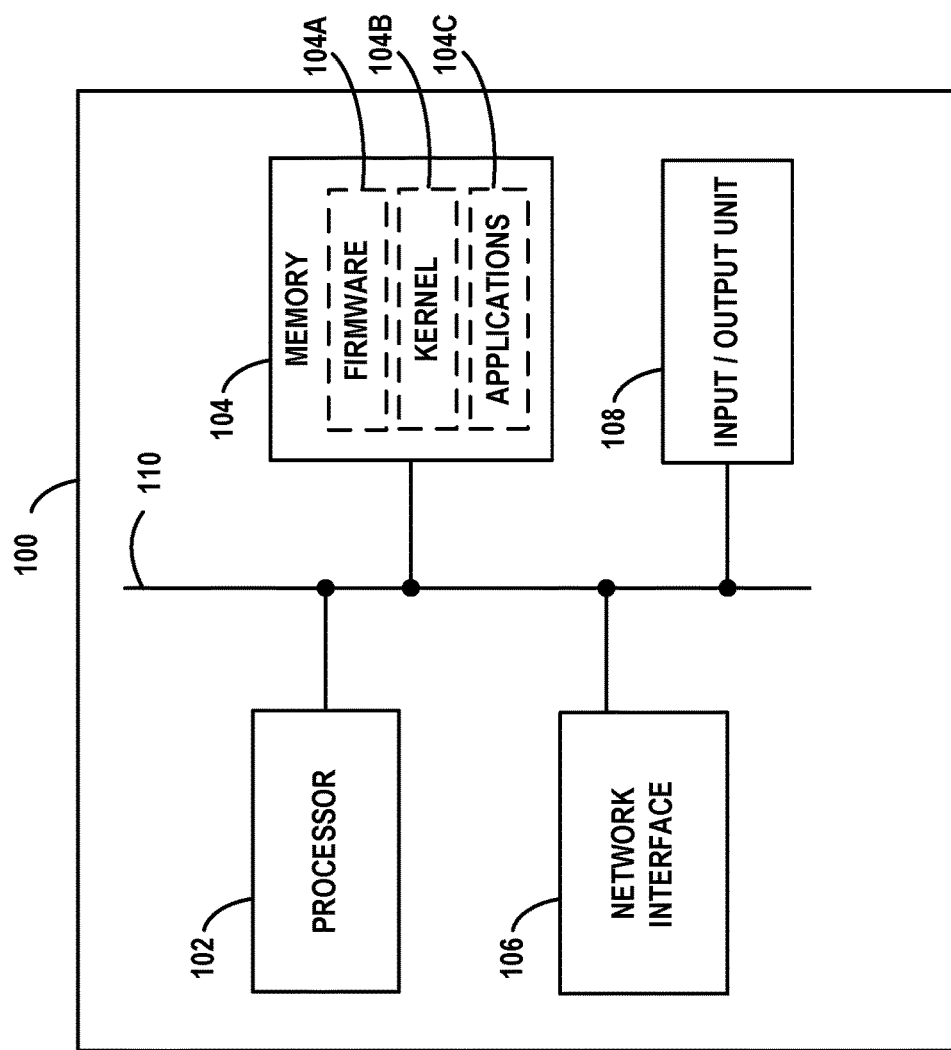
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
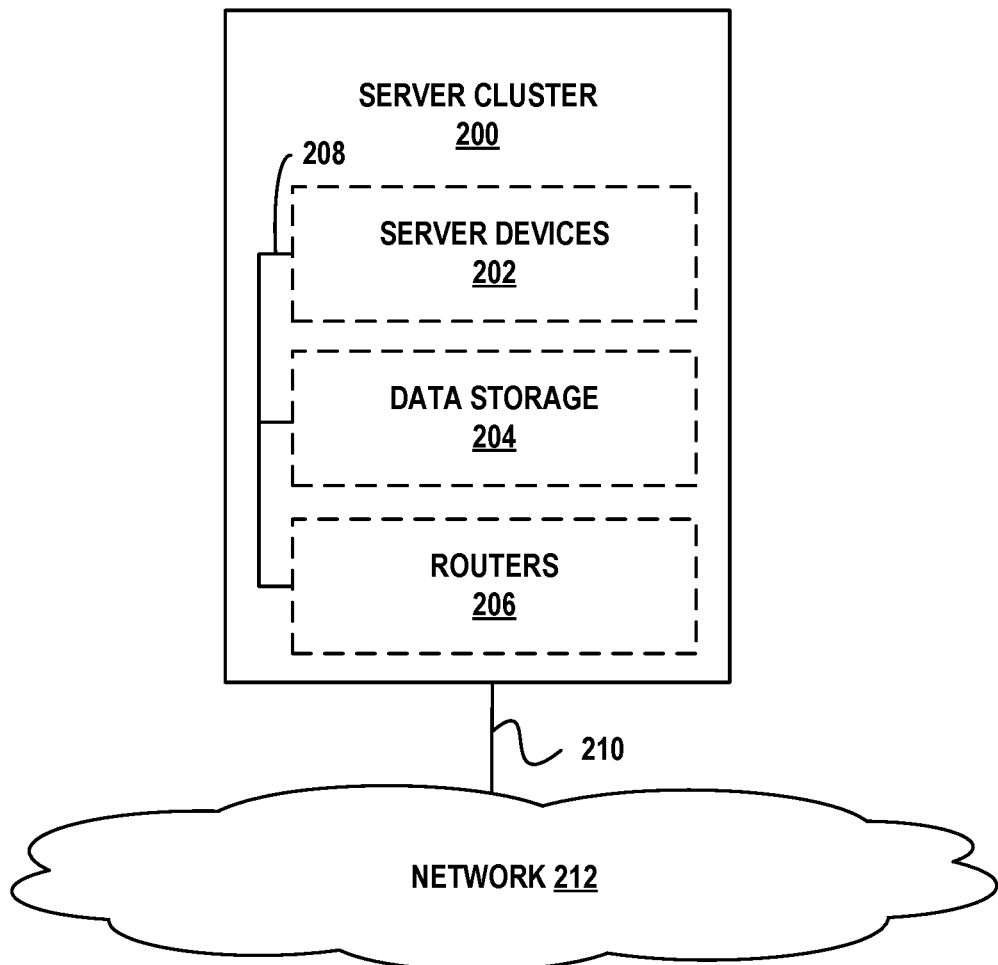
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
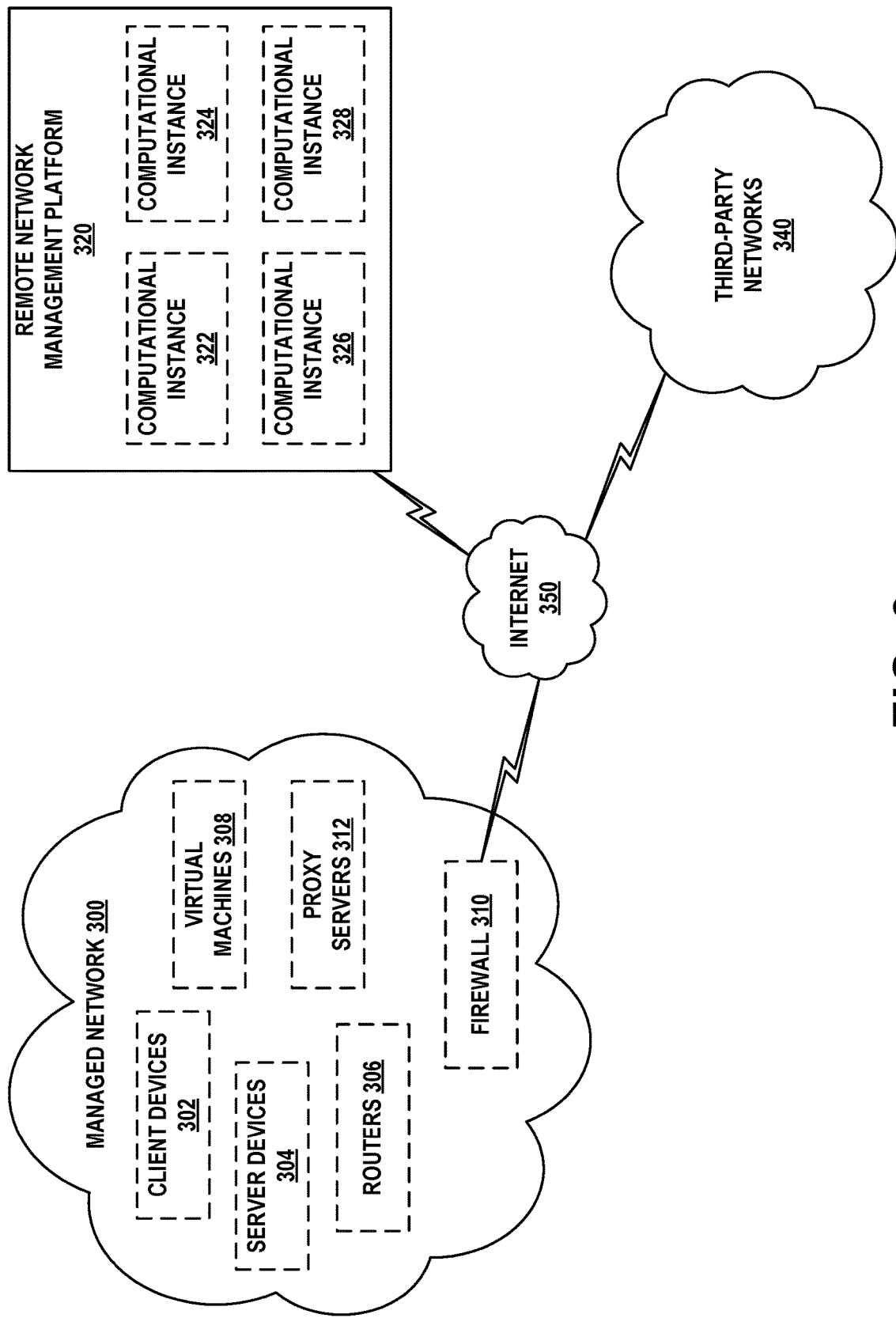
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
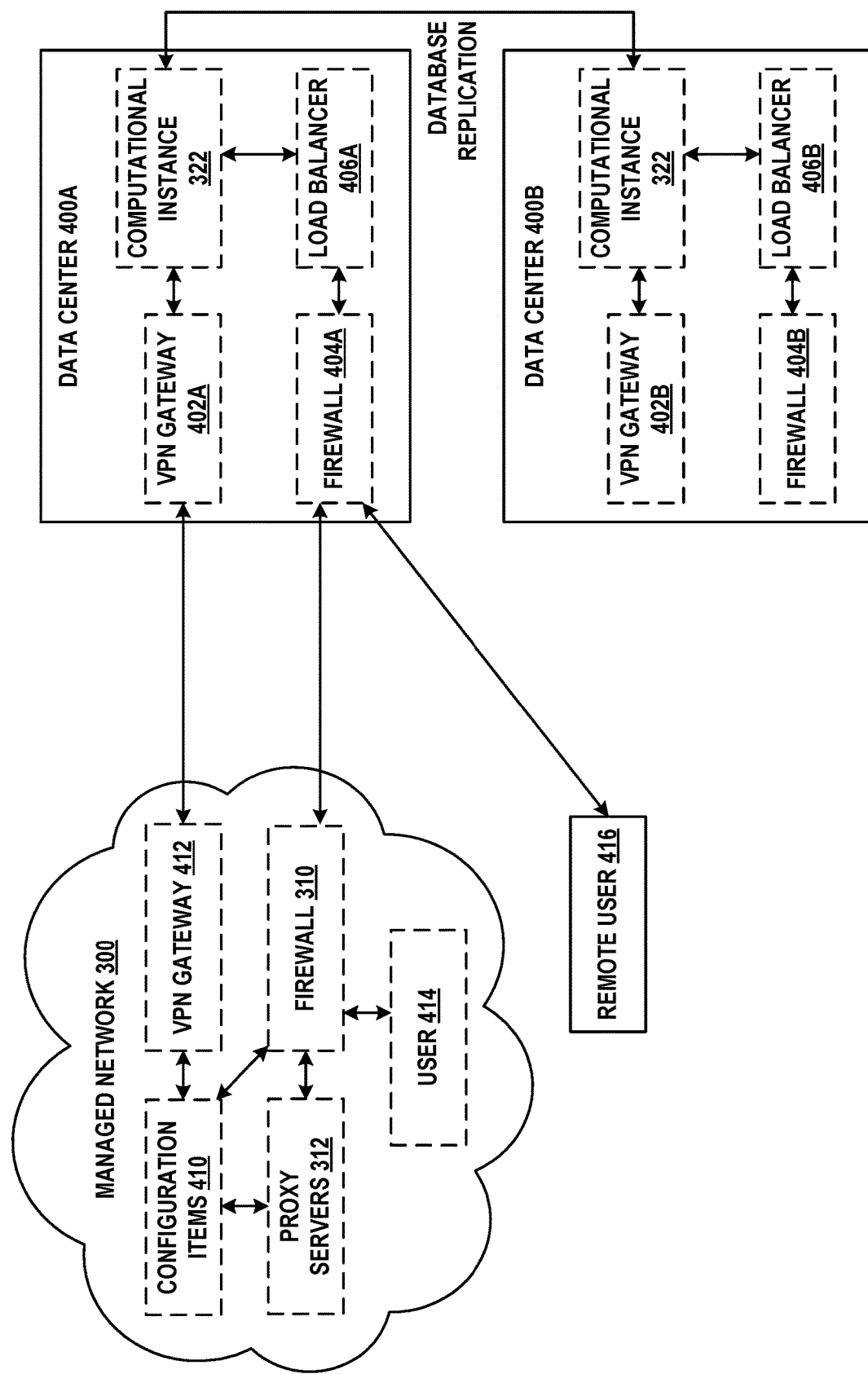
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
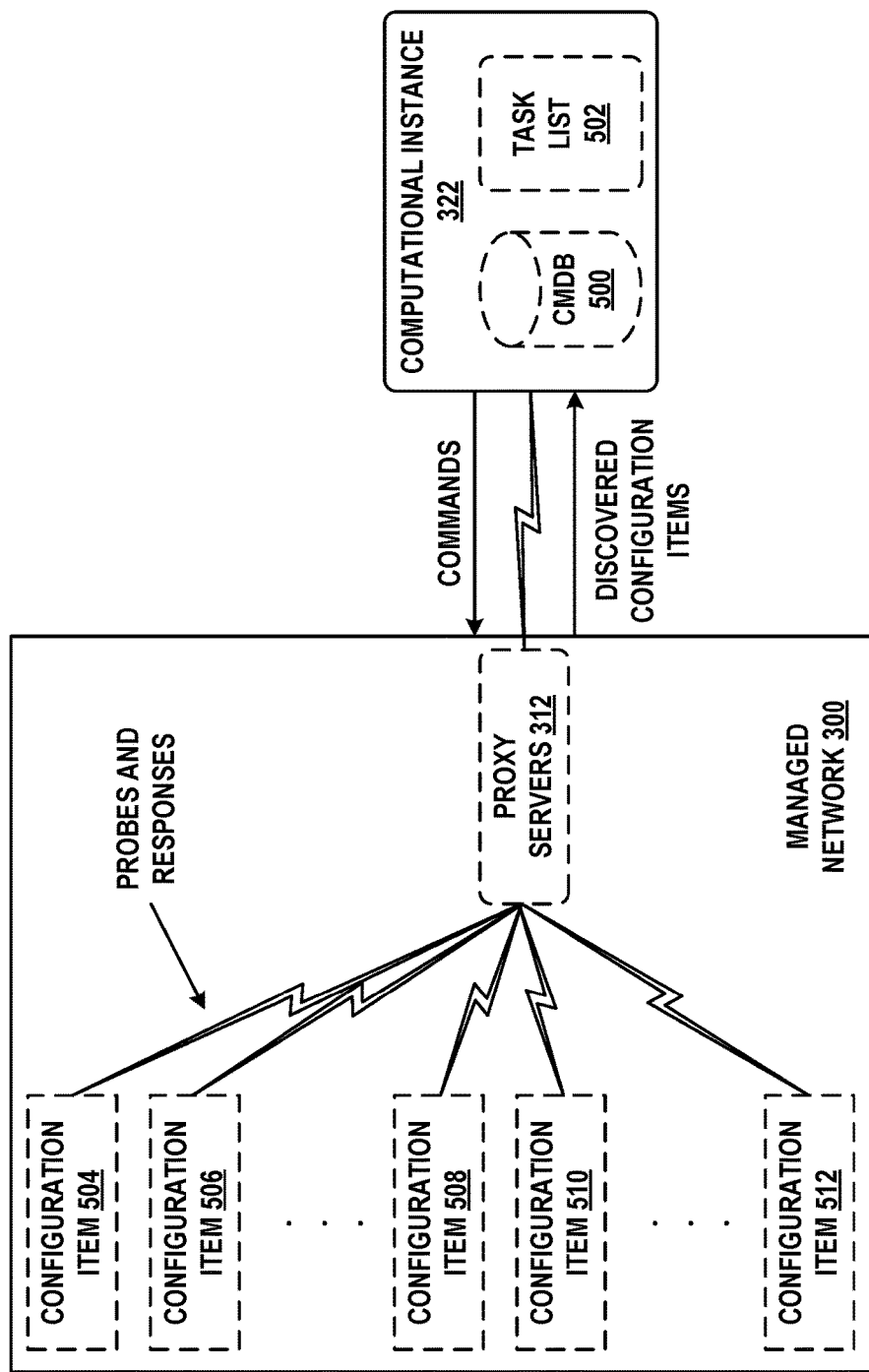
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
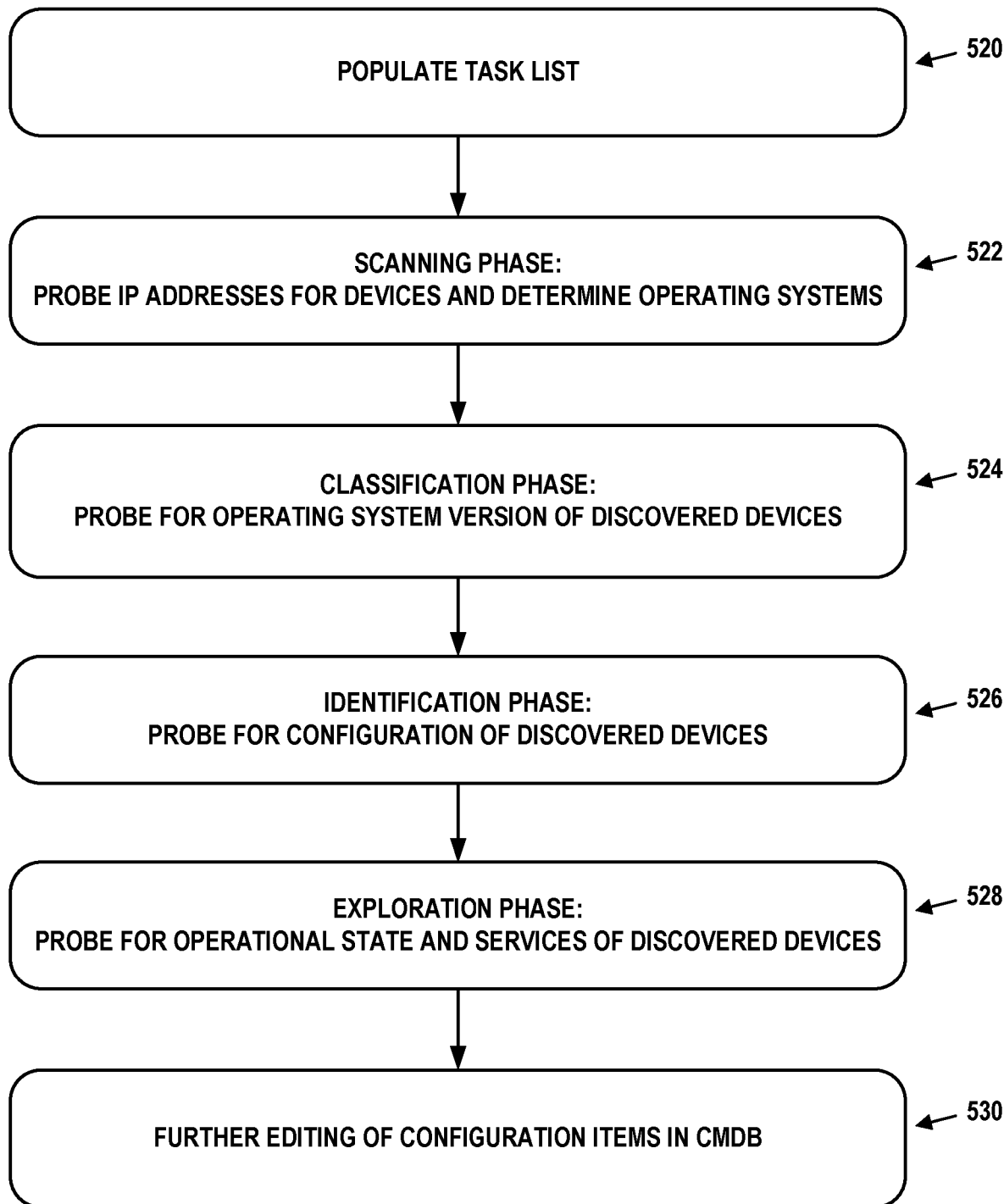
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Creation of Security Incident Records

In some scenarios, the enterprise may install, on one or more servers in managed network 300, third-party software that is executable on the server(s) and configured to help protect managed network 300 from security threats, such as malicious software and cyber-attacks (e.g., denial-of-service attacks or phishing). To facilitate this, the third-party software can be configured to create alert rules which in turn trigger alerts that notify the enterprise of events that occur in managed network 300—particularly events that are indicative of potential (e.g., suspected) and confirmed security threats. An alert rule can include data that defines one or more actions to take when one or more events occur, where at least one such action includes triggering an alert. The third-party software may be configured to store both the alerts and the alert rules in an application database of managed network 300 that is associated with the third-party software.

Generally, an "event" refers to an occurrence in managed network 300 that is associated with an operation (or operations) performed by at least one computing device and/or at least one software application of managed network 300. For example, an event can involve a computing device attempting to access another computing device of managed network 300, a computing device receiving an email, or an error message being generated when a computing device attempts to log into a server (e.g., a message indicating that a connection to the server has been denied), among other possibilities.

Alert rules can be created in various ways. For example, the third-party software can interface with various computing devices of managed network 300, as well as with various firewalls (e.g., firewall 310), antivirus software, and/or other hardware or software of managed network 300. Through these interfaces, the third-party software can gather and maintain, in the application database associated with the third-party software, event data representing various events that have occurred in managed network 300, such as those described above. The third-party software can then analyze the events and generate an alert rule based on the analysis. For example, the third-party software can be configured to determine that a set of one or more events that have occurred in managed network 300 are indicative of a security threat and, in response to that determination, create an alert rule associated with the set of events. Thus, when one or more events in the set of events occurs, the alert rule triggers an alert. Additionally or alternatively, the third-party software can be configured to enable an enterprise to manually configure an alert rule. In some implementations of the third-party software, an alert rule might specify that all events in a set of events must occur in order for the alert to be triggered. Alternatively, the alert rule might specify that only one or more events of the set of events need occur in order for the alert to be triggered. Further, in some scenarios, the same event might trigger multiple different alerts.

The event data may include a variety of information that enables the third-party software to analyze the events and determine whether an alert rule should be created. For example, the event data can include source/destination IP addresses, hostnames, usernames, identifiers of email attachments (e.g., file names), and/or software identifiers involved in an event, as well as a date/time at which the event occurred. Further, when the third-party software or other devices within managed network 300 analyze message content (e.g., email messages) to detect spam, viruses, and the like, the results of the analysis or analyses can be included as event data. Other examples of event data are possible as well.

As an example of how an alert rule is created, consider the following scenario. The third-party software may detect a first event in which a computing device unsuccessfully attempted to access a server and an error message was generated as a result. A few seconds later, the third-party software may detect a second event in which the computing device again unsuccessfully attempted to access the server and another error message was generated as a result. The third-party software can store event data representing the two events and can then analyze the two events. For example, based on the occurrence of successive access errors related to the computing device, the third-party software might create an alert rule that triggers an alert when a single computing device's attempts to access the server result in two or more successive access errors. As another example, consider a scenario in which the third-party software detects that one or more internal risk management audits in managed network 300 have failed. In this scenario, the third-party software may create an alert rule that triggers an alert when one or more of such audits fail. Other examples are possible as well.

When an alert is triggered, the third-party software may store, in the application database and in fields defined in accordance with the third-party software (e.g., fields defined in accordance with a data model for the third-party software), any event data that is related to the alert. For example, when an alert is triggered by the alert rule described above for successive access errors, the third-party software may store, in various fields of the application database, an IP address of the computing device that was attempting to access the server, a server identifier, a username being used to access the server, and/or a data/time of each attempt, among other possible information. In some implementations, the third-party software may notify a user or users that the alert has been triggered. For example, the third-party software may notify the user(s) by way of a text message, email, and/or phone call.

One function of remote network management platform 320 can be to provide security operations for enterprises. As such, remote network management platform 320 may provide its own services for managing security incidents as well. For example, remote network management platform 320 can provide a security operations software application through which an authorized user (e.g., a security administrator or agent tasked with resolving security incidents) can create and store, within a security incident database, a security incident record that includes various fields of information defined in accordance with a data model for remote network management platform 320. These fields can include data that identifies or describes the security incident, its status (e.g., open, closed), a priority level for the security incident (e.g., low, medium, high), an impact level on the enterprise (e.g., critical, non-critical), computing devices and/or user profiles involved in and affected by the security incident, and/or the individual or team of individuals to which the security incident record is assigned for tracking and resolution, among other possibilities.

The present disclosure provides an improvement to remote network management platform 320 that integrates the security services provided by third-party software with security services provided by remote network management platform 320. In particular, a computational instance of remote network management platform 320, such as computational instance 322, can run a software application that is configured to enable the enterprise to pull, from the third-party software application's database, past alerts that have been triggered with respect to managed network 300 and create security incident records from those alerts. Because the fields of the past alerts may be different from the security incident record fields that are defined in accordance with remote network management platform 320, the disclosed software application can provide and/or enable the enterprise to create mapping data that maps the fields of the past alerts to the security incident record fields.

Herein, with respect to a given moment in time where the software application pulls past alerts, the term "past alert" can refer to any alert that has been triggered before that moment in time.

The disclosed software application described above may be referred to herein as a "scoped" application. As a general matter, a scoped application may be an application developed using a particular application programming interface (API) provided by remote network management platform 320 and customized for a particular purpose. A scoped application can be developed and/or customized by an entity that controls remote network management platform 320 or by a customer of remote network management platform 320. Further, a scoped application may have access rules, perhaps in the form of an access control list (ACL), that define which users (e.g., enterprises, or employees thereof, with an administrative role) and/or other applications are allowed to access the scoped application and/or its data.

In the context of the present disclosure, the disclosed software application may be a scoped security operations application that is designed to create and write to the security incident database security incident records that are based on past alerts triggered by alert rules created by the third-party software. To facilitate this, the third-party software can provide an API and the scoped application may be designed to interface with a proxy server (e.g., one of proxy servers 312) and instruct the proxy server to call the third-party software's API to request the past alerts and to facilitate other operations described herein.

Implementations of this disclosure provide technological improvements that are particular to computer networks and computing systems. For example, managed networks—particularly large managed networks with hundreds or thousands of computing devices—can cause tens or hundreds of security-related notifications to occur each day, at least some of which may involve serious security threats. For at least this reason, it is desirable for such a managed network to have in place a mechanism for reliably and efficiently managing and resolving security incidents. The remote network management platform 320 described herein provides such improvements.

Computing system-specific technological problems, such as inefficiency, unreliability, and complexity that can accompany the use of computer technology in data management (e.g., consolidation and data transformation) and risk management (e.g., assessing security threats and determining the impact thereof), can be wholly or partially solved by the implementations of this disclosure. For example, implementations of this disclosure provide a unified source for security incident management and remediation within remote network management platform 320. Thus, rather than having to first refer to third-party software alert data and then make risk management decisions or manually create corresponding security incident records on the remote network management platform side, the enterprise can use the scoped application to automatically pull desired alerts, automatically create, write, and view corresponding security incident records (or at least fill out some portion of a security incident record using an alert, so the enterprise can then efficiently fill in other portions with supplemental information to complete the security incident record), and automatically close alerts when their corresponding security incident records are closed. The scoped application can also advantageously enable the enterprise to customize security incident record creation, particularly by enabling the enterprise to specify which past alerts are pulled and how the past alert fields are mapped to security incident record fields. Further, these and other aspects of the disclosure enable the enterprise to gain additional insight into security incidents, reduce the amount of time taken to assess and act on security incidents, and make more informed decisions for acting on security incidents.

These and other improvements are described in more detail below, though the operations described below are for purposes of example and that implementations may provide other improvements as well.

Figure 6:
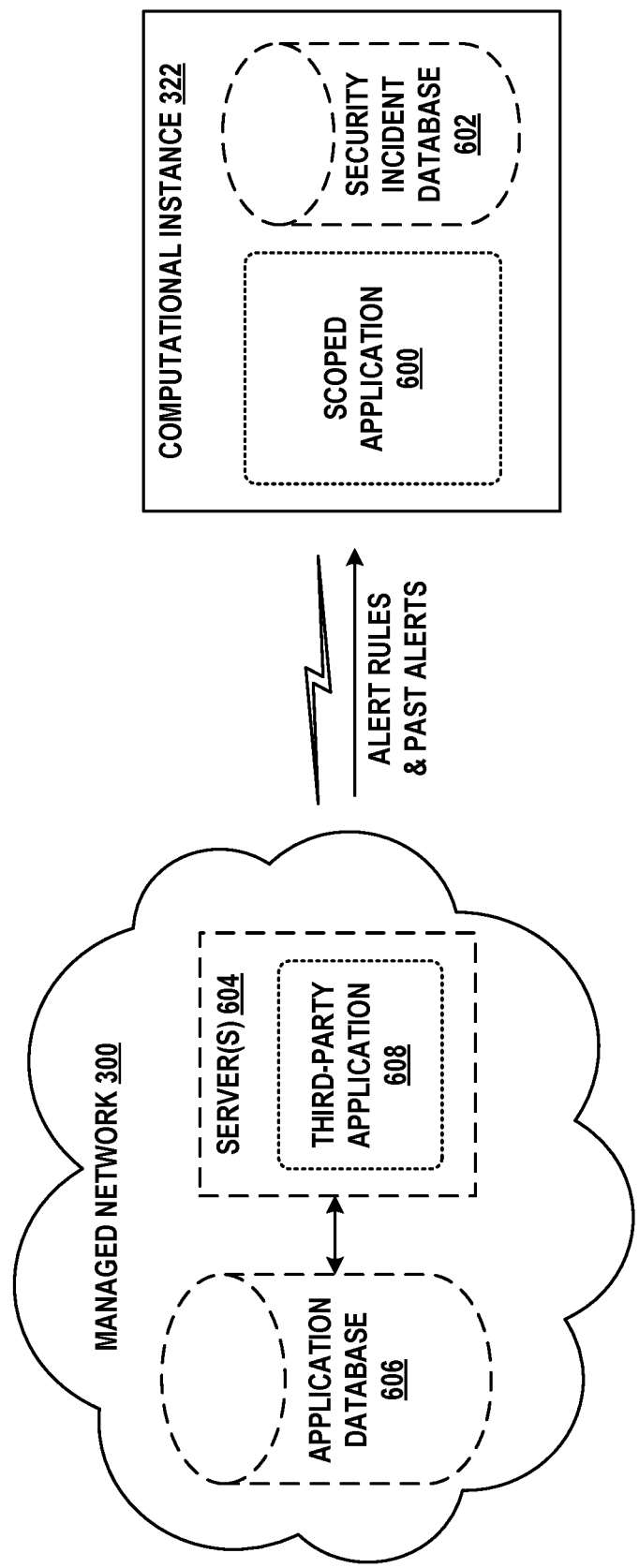
FIG. 6 illustrates a computing system for creating security incident records, in accordance with example embodiments.

FIG. 6 illustrates a computing system for creating security incident records, in accordance with example embodiments. In particular, FIG. 6 illustrates computational instance 322, which includes scoped application 600 and security incident database 602. Scoped application 600 can be configured to perform one or more of the operations described herein. Security incident database 602 can store a variety of security incident records associated with managed network 300, including those created from past alerts. The security incident records stored at security incident database 602 can include fields defined in accordance with remote network management platform 320. For example, the fields can be defined in accordance with a data model that has been defined by remote network management platform 320 for storing data—particularly security incident records—in security incident database 602.

FIG. 6 also illustrates computational instance 322 in communication with managed network 300—particularly with one or more servers 604 of managed network 300, which is/are in turn in communication with application database 606. Further, server(s) 604 include third-party application 608 (referred to above as "third-party software"), which is executable on server(s) 604. Server(s) 604 can include server devices 304 described above, or can be additional servers separate from server devices 304.

In line with the discussion above, application database 606 can store, in fields defined in accordance with third-party software application 608 (e.g., defined in accordance with a data model that third-party application 608 uses for storing data), past alerts that have been triggered in managed network 300 and alert rules that have triggered the past alerts. In some examples, application database 606 can additionally store alert rules that are defined but have not yet triggered an alert, event data, and any additional data or metadata associated with the past alerts and alert rules.

An example process for creating security incident records from alerts will now be described in more detail with respect to FIG. 6. Scoped application 600 can be configured to provide representations of graphical user interfaces (GUIs) that can be used to facilitate various operations described herein. Thus, the process will also be described with respect to FIGS. 7A, 7B, 7C, 7D, 7E, and 7F, each of which illustrate an example GUI.

In some implementations, scoped application 600 can provide for display a representation of a graphical user interface (GUI) that enables the enterprise (e.g., a user of the enterprise with administrator privileges) to create an alert profile that defines for the enterprise which of the alert rules to use for creating security incident records and how fields of past alerts triggered by those alert rules will be mapped to security incident record fields. Multiple different alert profiles can be created for the enterprise using scoped application 600. The ability to create alert profiles can be advantageous in that it enables the enterprise to create, customize, and then perhaps make changes to enterprise-specific preferences for how security incident records are created. For example, some alerts can be triggered more often in some departments of the enterprise than in others, and thus, one or more alert profiles can be created and tailored toward the needs of one department, and one or more other alert profiles can be created and tailored toward the needs of another department. Other examples are possible as well.

Figure 7A:
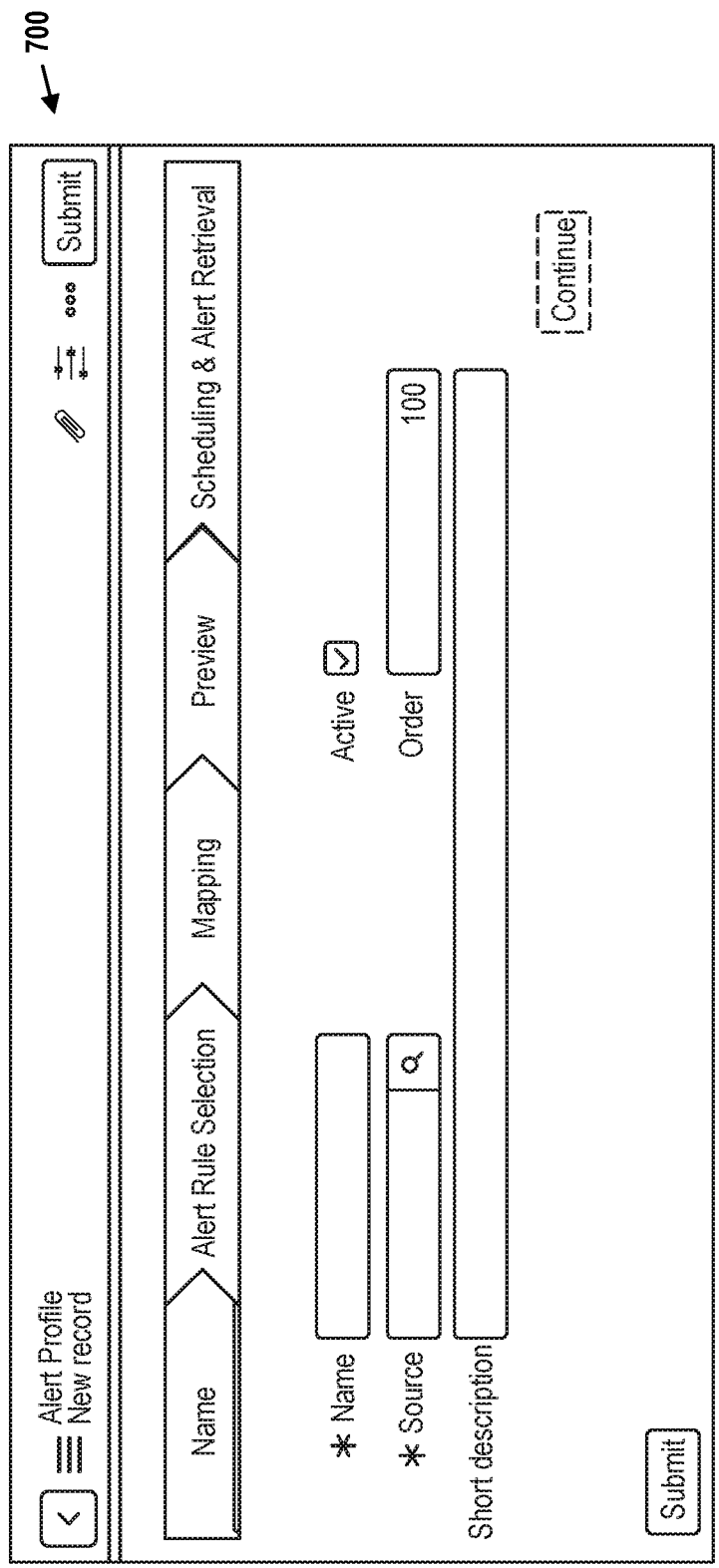
FIG. 7A illustrates a GUI, in accordance with example embodiments.

FIG. 7A illustrates an example GUI 700 for creating an alert profile. GUI 700 is a first step in a multi-step process for creating an alert profile. The steps in the multi-step process are described herein as being performed in a particular order, and thus GUIs supporting performance of these steps are also performed in the particular order. However, in other implementations, steps in the multi-step process can be performed in a different order, and thus the associated GUIs can be displayed in a different order. Steps/GUIs can also be added or omitted.

As shown, GUI 700 enables the enterprise to enter a name for the alert profile, a source (e.g., an identifier of one or more servers, such as server(s) 604, with which scoped application 600 will communicate to retrieve alert rules, past alerts, and/or other data from application database 606 or another database), a short description of the alert profile, and an order for the alert profile. The "Order" field, in particular, can enable a user to enter a number or other representation of a priority order in which the alert profile should be used to create security incident records. For example, scoped application 600 can be configured to create security incident records using an alert profile with a lower order (e.g., 10) before creating security incident records using an alert profile with a higher order (e.g., 100). Other examples of priority order values are possible as well.

The GUI 700 also enables the enterprise to select whether the alert profile is active or not. When an alert profile is active, scoped application 600 may repeatedly request and retrieve alert rules and past alerts, and create security incident records, in accordance with the alert profile. Whereas, when an alert profile is inactive, scoped application 600 can refrain from taking such actions. Further, GUI 700 also provides a selectable link for continuing to the next step of the multi-step process for creating the alert profile. When this link (i.e., the "Continue" button) is selected, scoped application 600 can generate and provide another GUI (e.g., GUI 702, shown in FIG. 7B) for performing another operation of the disclosed process, such as selecting alert rules for which scoped application 600 should request associated alerts, as discussed in more detail below.

In the disclosed process, scoped application 600 can request and receive alert rules from application database 606. To facilitate this, scoped application 600 transmit a request message or a series of request messages to third-party application 608 that request some or all of the alert rules currently stored in application database 606. In some implementations, scoped application 600 can request and receive the alert rules automatically before any alert profile is created or at some point after an alert profile is created (e.g., in response to receiving input data representing a command to retrieve some or all of the current alert rules from application database 606). A given alert rule of the alert rules can be received in the form of data identifying the alert rule, such as an alphanumeric identifier of the alert rule or any other identifying data. Other data can be included with an alert rule as well, such as a short description of the alert rule (e.g., "Denial-of-Service Attack").

Scoped application 600 can then receive user input data representing selection of a set of the alert rules. To facilitate this, scoped application 600 can provide a GUI containing an alert rule selection region for enabling the enterprise to select the set of alert rules. As such, the input data can take the form of a command provided via the GUI or another input device of the computing device on which the enterprise is running scoped application 600.

Figure 7B:
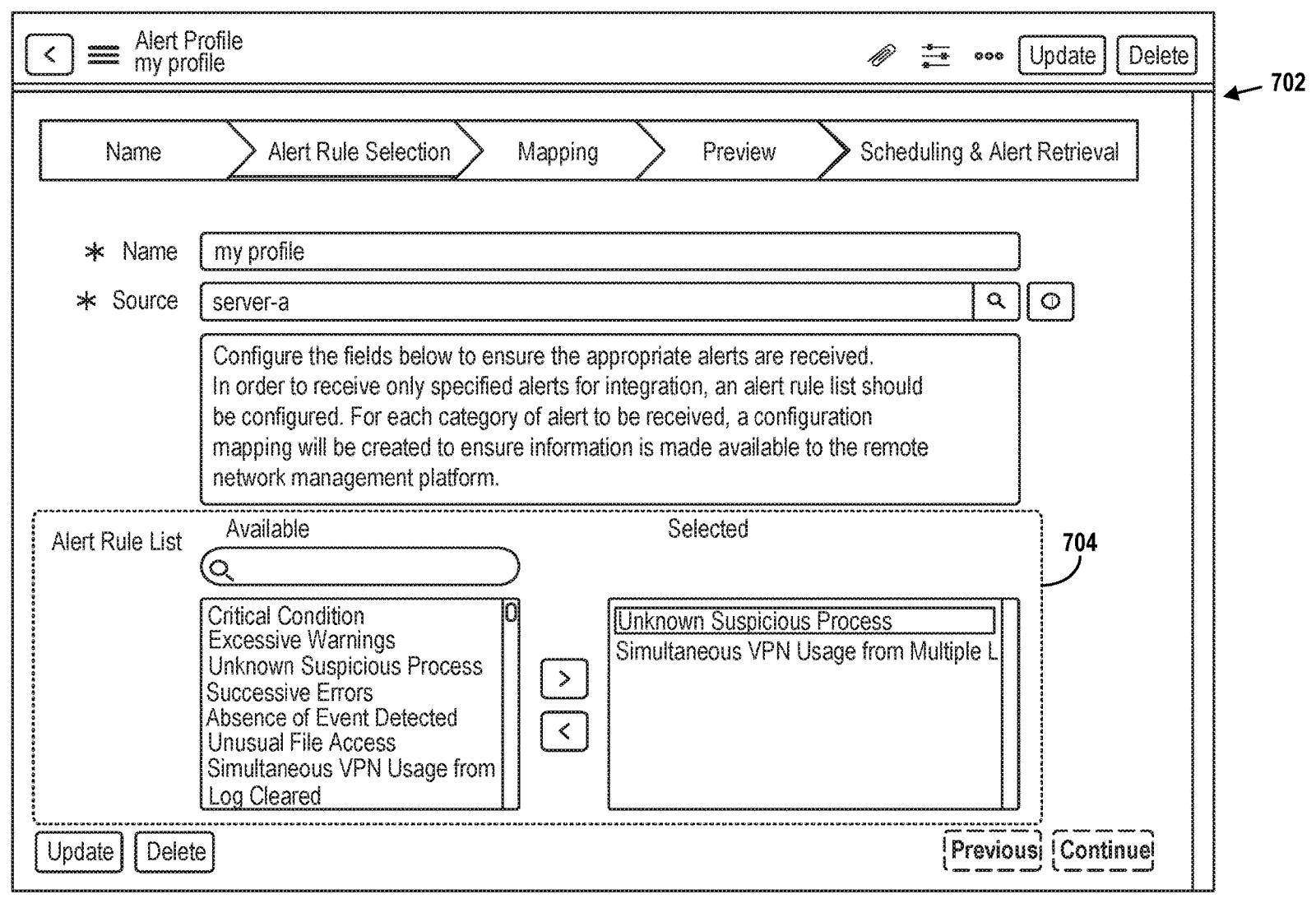

FIG. 7B illustrates an example of such a GUI. In particular, GUI 702 is a second step in the multi-step process for creating the alert profile. At the top of GUI 702, the name and source of the alert profile are shown. GUI 702 also contains an alert rule selection region 704 in which the enterprise can view and search through a list of available alert rules, each identified by a short description of the alert rule. From this list, the enterprise can select a set of one or more alert rules for which scoped application 600 should pull associated past alerts from application database 606. By providing a searchable list such as this, the enterprise can quickly find and select alert rules.

Further, GUI 702 also provides a selectable link for continuing to the next step of the multi-step process for creating the alert profile, and a selectable link for returning to the previous step of the multi-step process. When the selectable link for continuing (i.e., the "Continue" button) is selected, scoped application 600 can generate and provide another GUI (e.g., GUI 706, shown in FIG. 7C) for performing yet another operation of the disclosed process, such as defining mapping data for creating security incident records, as discussed in more detail below. When the selectable link for returning to the previous step (i.e., the "Previous" button, to the left of the "Continue" button) is selected, scoped application 600 can generate and provide the previous GUI, GUI 700.

Although GUI 702 is dedicated to selecting alert rules, in other implementations, scoped application 600 can provide a GUI that combines an alert rule selection region with one or more other regions described herein.

Based on the input data, scoped application 600 can request and receive, from application database 606, a set of the past alerts that have been triggered by the set of the alert rules. For example, scoped application 600 can transmit a request message or a series of request messages to third-party application 608 that request the set of the past alerts. Each such request can include an identifier of at least one alert rule of the selected set of alert rules. Third-party application 608 can then use the identifier(s) to retrieve, from application database 606, the corresponding past alert(s) that were triggered by the identified alert rule(s) and send them the past alert(s) back to scoped application 600. A past alert of the set of past alerts can be received in the form of data identifying the past alert, such as an alphanumeric identifier of the past alert or any other identifying data. Other data can be included with a past alert as well, such as an identifier of the alert rule that triggered the past alert, a time at which the past alert was triggered (e.g., a date and time of day at which the past alert was triggered), an identifier of an alert rule that triggered the past alert, a status of the past alert (e.g., New, Opened, Closed, False Alarm), and a severity rating of the past alert (e.g., low, medium, high).

In some implementations, for a given past alert of the set of past alerts, scoped application 600 can also request and receive event data representing one or more events that have occurred in managed network 300 and contributed to triggering the past alert. Within examples, scoped application 600 can receive the event data along with the past alert. Within other examples, once a past alert is received, scoped application 600 can extract an identifier for the past alert and use the identifier to then request and receive event data associated with the past alert. Third-party application 608 can then use the identifier to retrieve, from application database 606, the corresponding event data for the past alert and send the event data back to scoped application 600.

As discussed above, the event data can include various data associated with one or more events. These one or more events can include events that were involved in creating the alert rule that triggered the past alert for which the event data is being retrieved. As noted above, the event data can include source/destination IP addresses, hostnames, usernames, identifiers of email attachments (e.g., file names), and/or software identifiers involved in an event, as well as a date/time at which the event occurred, among other possible information.

The event data can also include a classification (e.g., suspicious activity or malware) of the past alert with which the event data is associated. In some examples, the classification of the past alert can take the same form as the description of the alert rule that triggered the past alert. In other examples, the classification of the past alert and the description of the alert rule can take different forms. For instance, the description of the alert rule may be more specific than the classification of the past alert. Other examples are possible as well. As an example, a past alert may have been triggered by an alert rule for simultaneous VPN usage by a single user from multiple different locations (i.e., different IP addresses). Event data for this past alert can include, for example, a username of the user, a first IP address, a time at which the user logged into the VPN at the first IP address, a second IP address, and a time at which the user logged into the VPN at the second IP address. Other examples are possible as well. Event data can be valuable to have stored in security incident database 602 and mapped to security incident record fields because it can enable the enterprise to further investigate the cause of the past alert (and corresponding security incident) without having to request additional information from application database 606. This is another reason why a unified source for risk/incident management is advantageous.

When computational instance 322 receives past alerts, alert rules, event data, etc., that information can be stored in a database accessible to scoped application 600 for use in creating security incident records. For example, the received information can be stored in security incident database 602 and/or in another database.

Any data described herein that is associated with past alerts and alert rules on the third-party side (e.g., alert or alert rule identifiers, severity rating, alert status, event data, etc.), can be contained in corresponding fields defined in accordance with third-party application 608 as noted above. Because these fields differ from fields for security incident records on the remote network management platform side, scoped application 600 can provide the enterprise with the ability to use mapping data that, as a general matter, maps fields on the third-party side to fields on the remote network management platform side. To facilitate this, the mapping data defines pairwise associations between fields of the set of the past alerts and fields of security incident records.

The fields of the set of past alerts can include any one or more of the fields described above. Examples of fields of security incident records can include: (i) a time at which a security incident record was created (e.g., a date and time of day at which the security incident record was created), (ii) an identifier of the security incident record, (iii) an identifier of a computing device with which the security incident record is associated (e.g., a type of configuration item or identifier of the configuration item impacted by a security incident, such as one or more of client devices 302, routers 306, virtual machines 308, etc.), (iv) an identifier of a user with which the security incident record is associated, (v) a status of the security incident record (e.g., open, closed, cancelled, draft), (vi) a description of a security incident with which the security incident record is associated, (vii) a priority level of the security incident record (e.g., on a scale of 1-5, where 1 is the highest and 5 is the lowest), (viii) a category of the security incident record (e.g., phishing), (xi) a subcategory of the security incident record (e.g., for a category of "Phishing," a subcategory may be "Scan email activity," and for a category of "Equipment Loss," a subcategory may be "Stolen equipment"), (x) an enterprise impact rating associated with the security incident record, (xi) a risk score of the security incident record (e.g., a number or other representation of an expected negative impact the security incident has on one or more computing devices of managed network 300), and (xii) a source of the security incident (e.g., an identifier of the source of the security incident, such as a phone call, email, or network monitoring), among other possibilities.

Scoped application 600 can be configured to provide predefined mapping data, such as mapping data defined by an entity that controls remote network management platform 320. Additionally or alternatively, scoped application 600 can be configured to provide the enterprise with the ability to create and store, in a database associated with computational instance 322 (e.g., security incident database 602), new mapping data. Scoped application 600 can be configured to provide the enterprise with the ability to edit existing mapping data as well. To facilitate this, scoped application 600 can provide a GUI containing a mapping region for enabling the enterprise to (i) select fields of the set of the past alerts, (ii) select fields of the security incident records to which to associate to the fields of the set of the past alerts, and (iii) generate mapping data based on the selections. Scoped application 600 can receive input data representing each selection and the generation of the mapping data.

Figure 7C:
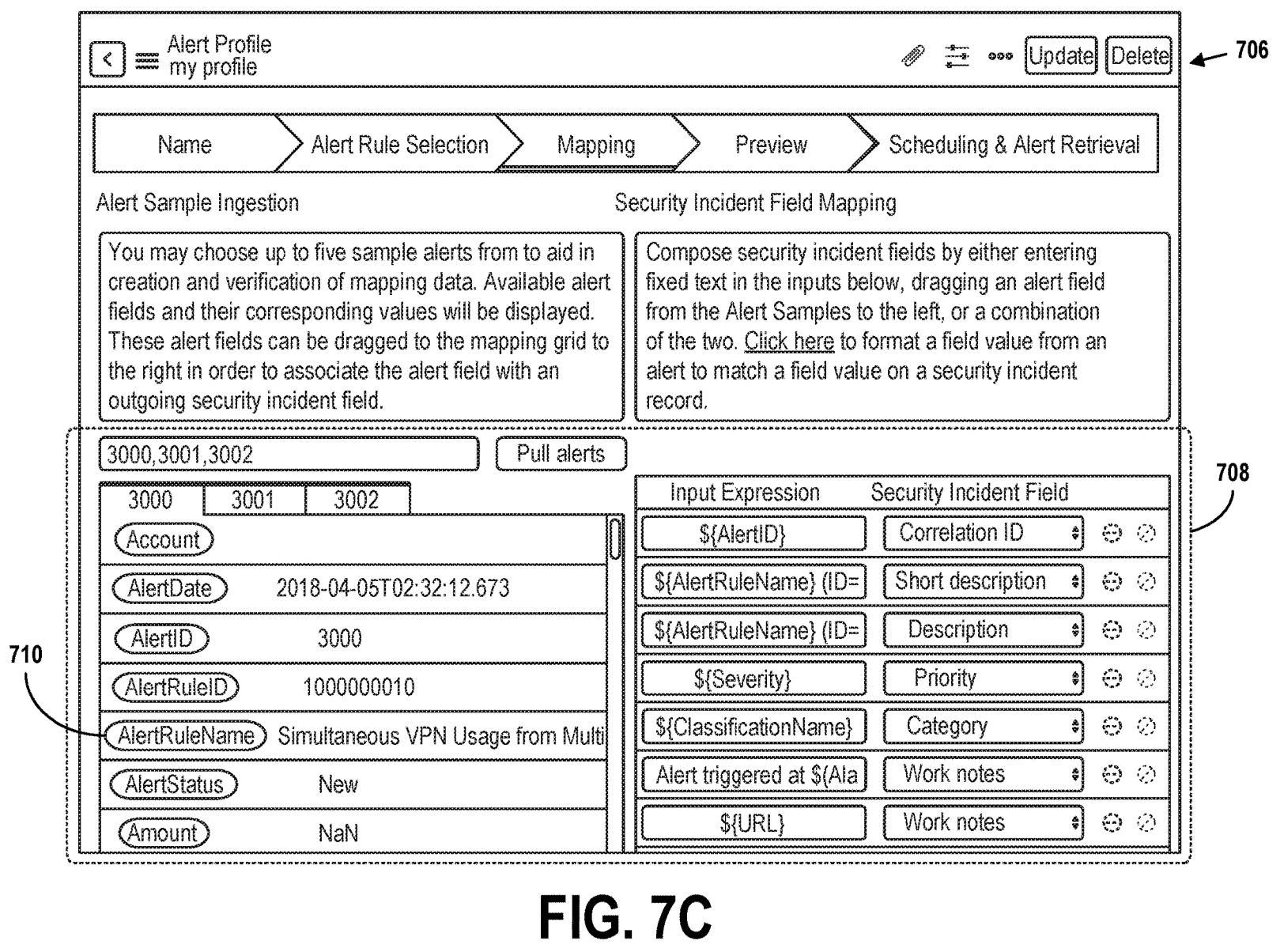

FIG. 7C illustrates an example of such a GUI. In particular, GUI 706 is a third step in the multi-step process for creating the alert profile. GUI 706 includes an example form that a mapping region might take. Although only mapping region 708 is shown in GUI 706, in other implementations, scoped application 600 can provide a GUI that combines the mapping region with one or more other regions described herein.

As shown, the left side of mapping region 708 enables the enterprise to use identifiers of the set of the past alerts to search for a subset of the set of the past alerts and, for each past alert of the subset, view various fields. For example, a user can enter alert identifiers in a box to the left of the "Pull Alerts" button, then select the "Pull Alerts" button to search for the past alerts having those identifiers. When a search is performed, not all fields may contain values. Regardless, the right side of mapping region 708 enables the enterprise to select security incident record fields to which to map the fields from the left side of mapping region 708. The right side of mapping region 708 includes two columns: a column labelled "Input Expression" and a column labelled "Security Incident Field." Boxes in the "Input Expression" column can display a string that represents which past alert field (or fields) are mapped to the corresponding security incident record field in the "Security Incident Field" column. Scoped application 600 can then evaluate the strings in the "Input Expression" boxes to determine how to display the past alert field data in the corresponding security incident record field.

GUI 706 can enable the enterprise to associate the past alert fields with the security incident record fields in various ways. For example, the user can click on an icon for a past alert field, such as icon 710, and drag the icon to one of the boxes in the "Input Expression" column on the right side of mapping region 708. This may trigger scoped application 700 to display, in the "Input Expression" box, a string that expresses the past alert field represented by icon 710. The enterprise can then select, from a drop-down menu, a security incident record field to map to the past alert field represented by icon 710. Additionally or alternatively, the user can enter text in the "Input Expression" box that identifies the past alert field. In some implementations, the user can enter any desired text in an "Input Expression" box. As shown, for example, using the "Input Expression" box, the enterprise can set a security incident record field to contain information that combines enterprise-entered text with an alert field, such as by entering "Alert triggered at $(AlertDate)" in the "Input Expression" box that corresponds to the security incident record field, "Work Notes." The "Work Notes" field will thus display the text and the relevant alert date for the past alert, as opposed to just the relevant alert date. As another example, the enterprise may prefer that the "Work Notes" field includes text that generally indicates that the security incident record was created from an alert by third-party application 608 (e.g., "Alert triggered by third-party software."), so as to distinguish the security incident record from other security incident records that were not created in that manner. Other examples are possible as well.

In some implementations, scoped application 600 can be configured to accept a mapping that is not 1:1. For example, a single past alert field can be mapped to two different security incident record fields, or two past alert fields can be mapped to a single security incident record field so that the data in both past alert fields will be contained and displayed in the security incident record field. In other implementations, however, scoped application 600 can be configured to accept only 1:1 mapping. Regardless of whether scoped application 600 allows for mappings other than 1:1, a "pairwise" association refers to one past alert field that is mapped to one security incident record field. Thus, by way of example, if Field A is mapped to both Field X and Field Y, the pairwise associations defined by the mapping data include a pairwise association of Field A to Field X, and another pairwise association of Field A to Field Y.

By way of GUI 706 or GUIs with similar functionality, scoped application 600 can provide the enterprise with an efficient, flexible way to customize how alerts should be mapped to security incident records.

In some implementations, scoped application 600 may also provide the enterprise with the ability to create and apply filtering rules that define criteria for narrowing down the past alerts for which scoped application 600 should create security incident records. To facilitate this, scoped application 600 can provide a GUI containing a filtering rules region for enabling selection of such filtering rules. In particular, the filtering rules can specify data that, when contained in one or more fields of a past alert, causes scoped application 600 to omit creating a security incident record that maps to the past alert. Scoped application 600 can then create security incident records in accordance with the filtering rules. If a past alert does not meet the criteria of the filtering rules, scoped application 600 may save, in security incident database 602 or another database, and perhaps additionally display, log data associated with the past alert, where the log data indicates that creation of a security incident record for the past alert was not successful. For example, scoped application 600 can save log data and display a notification stating "Alert ID 12345 could not be created."

Figure 7D:
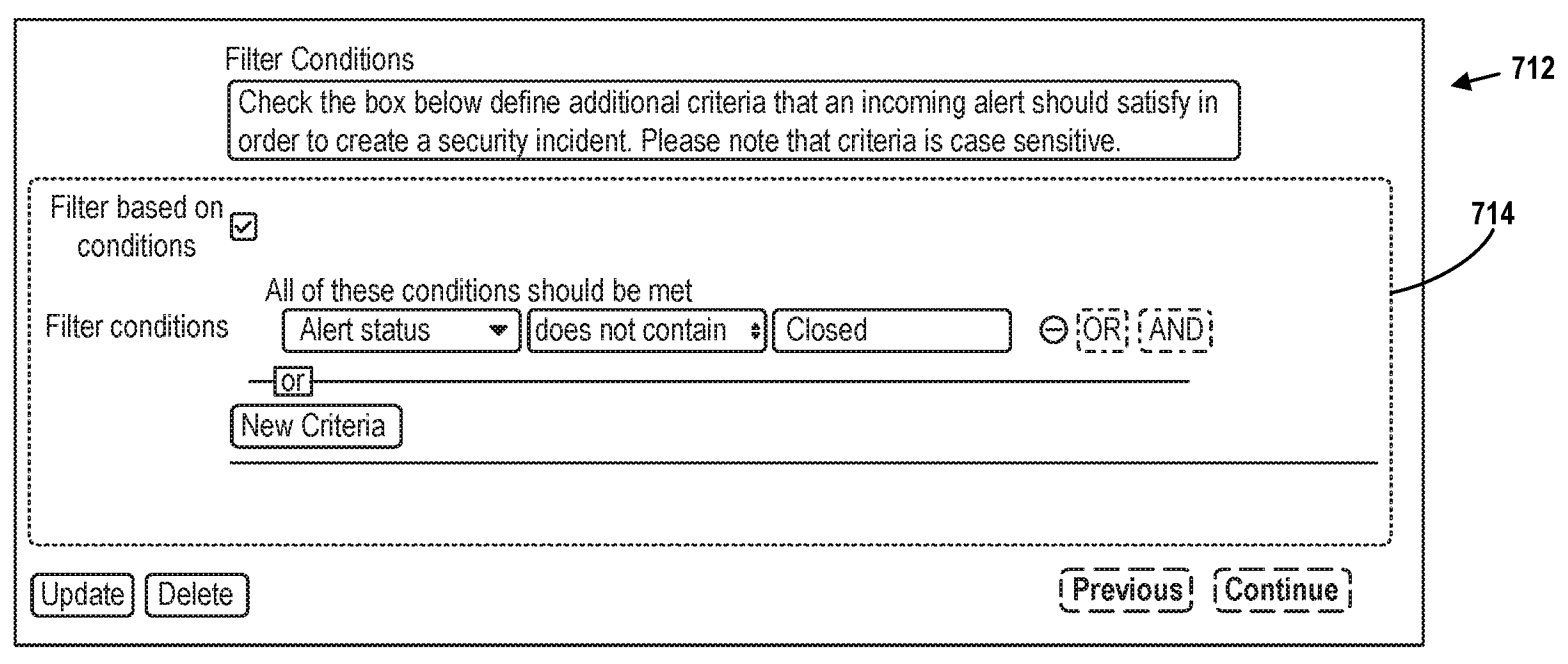

In some implementations, creating filtering rules can be a separate step in the multi-step process than creating mapping data, and can be performed on a separate GUI page, either before or after creating mapping data. However, FIG. 7D illustrates a scenario in which the third step of the multi-step process includes both creating mapping data and creating filtering rules. In particular, FIG. 7D illustrates another portion, GUI 712, of the same GUI page represented by GUI 706, where GUI 712 can be displayed when a user scrolls down from GUI 706. Phrased another way, the same GUI page in scoped application 600 can include both a mapping region and a filtering rules region.

GUI 712 includes an example form that a filtering rules region might take. As shown, filtering rules region 714 includes an option for the enterprise to filter past alerts based on one or more criteria. For example, the filtering criteria can include inclusion criteria and, as shown, the enterprise has specified that, when the "Alert Status" field of a past alert does not contain the data, "Closed," scoped application 600 should create a security incident record for the past alert. But if the "Alert Status" field contains the data, "Closed," scoped application 600 should omit creating a security incident record for the past alert. Other examples criteria are possible as well. In some implementations, scoped application 600 can include exclusion criteria as well.

Similar to the GUIs discussed above, GUI 712 also provides selectable links—the "Continue" button and the "Previous" button—for continuing to the next step of the multi-step process for creating the alert profile or for returning to the previous step of the multi-step process, respectively. When the "Continue" button is selected, for example, scoped application 600 can generate and provide another GUI (e.g., GUI 716, shown in FIG. 7E) for performing yet another operation of the disclosed process, such as viewing a preview of a security incident record created using the mapping data of the alert profile, as discussed in more detail below. When the "Previous" button is selected, scoped application 600 can generate and provide the previous GUI, GUI 702.

Using the mapping data stored within computational instance 322, scoped application 600 can create security incident records that map to the set of the past alerts and write the created security incident records to security incident database 602. If filtering rules have been created, the act of creating security incident records can be performed in accordance with the filtering rules, as discussed above.

At some point in time, such as during the act of creating security incident records or beforehand, scoped application 600 can check to see whether a security incident record already exists for a given past alert, so that scoped application 600 does not create any duplicates. If a security incident record already exists for the past alert, rather than create a duplicate record, scoped application 600 can check data representative of one or more aspects of the alert profile that pulled the past alert, such as the mapping data. If this data has been changed since the time the existing security incident record was created, such as if scoped application 600 receives input data representing an update to the mapping data, scoped application 600 can update the existing security incident record accordingly. If the data has not been changed, scoped application 600 may take omit updating the existing security incident record and may instead leave it as is.

In this manner, the enterprise can update the alert profile to reflect any desired changes, such as in a situation where the enterprise incorrectly set up the mapping data in the first place, and scoped application 600 can thereafter create or edit security incident records in accordance with those desired changes. For example, scoped application 600 can determine that the alert profile has been updated to change the mapping data (i.e., a change in the pairwise associations between alert fields and security incident record fields), pull past alerts associated with the selected set of alert rules specified in the alert profile, and then update existing security incident records to reflect the change in the mapping data.

In some scenarios, scoped application 600 can update the existing security incident record within seconds or less of receiving input data confirming the update to the alert profile. In other scenarios, however, scoped application 600 may be configured to wait a predetermined period of time (e.g., fifteen minutes) before updating the existing security incident record.

In some implementations, the act of checking whether a security incident record already exists for a past alert of the set of the past alerts can involve comparing an identifier of the past alert to reference data that is stored in security incident database 602. Within examples, the identifier of the past alert can be stored in security incident database 602 in a table separate from the security incident records, or can be stored in a different database. This reference data can indicate, for each of a plurality of past alerts, whether a corresponding security incident record has previously been created and written to security incident database 602, and thus already exists for the past alert identified by the identifier. Thus, the act of checking whether a security incident record already exists for a past alert of the set of the past alerts can also involve using the comparison to determine that a corresponding security incident record has previously been created and written to security incident database 602 for the past alert identified by the identifier. Then, in line with the discussion above, if the corresponding security incident record is active (i.e., not closed) and if the mapping data has been updated, scoped application 600 can use the current, updated mapping data (which may be different from the mapping data used when the security incident record was first created) to update the security incident record and write the updated security incident record to security incident database 602. Whereas, if the corresponding security incident record is inactive (i.e., closed), scoped application 600 can either log a message indicating that the corresponding security incident record is inactive, or can take no action. The act of writing the updated security incident record to security incident database 602 can involve replacing the existing security incident record with the updated security incident record, or propagating the changes between the two to the existing security incident record.

In some implementations, scoped application 600 may enable the enterprise to view a preview of how a sample security incident record will appear using the mapping data defined for the alert profile. The enterprise can use the preview to make sure that there are no errors with the mapping data and give the enterprise an opportunity to decide if the enterprise would like to make any changes before creating security incident records using the mapping data. To facilitate this, scoped application 600 can use the mapping data to map one or more of the fields of the set of the past alerts to fields of a sample security incident record (i.e., a draft record) without writing the sample security incident record to security incident database 602. In particular, scoped application 600 can select, or the enterprise can specify, an identifier of a past alert for which to create the sample security incident record. Scoped application 600 can then provide a GUI including a preview region in which the enterprise can view the sample security incident record.

Figure 7E:
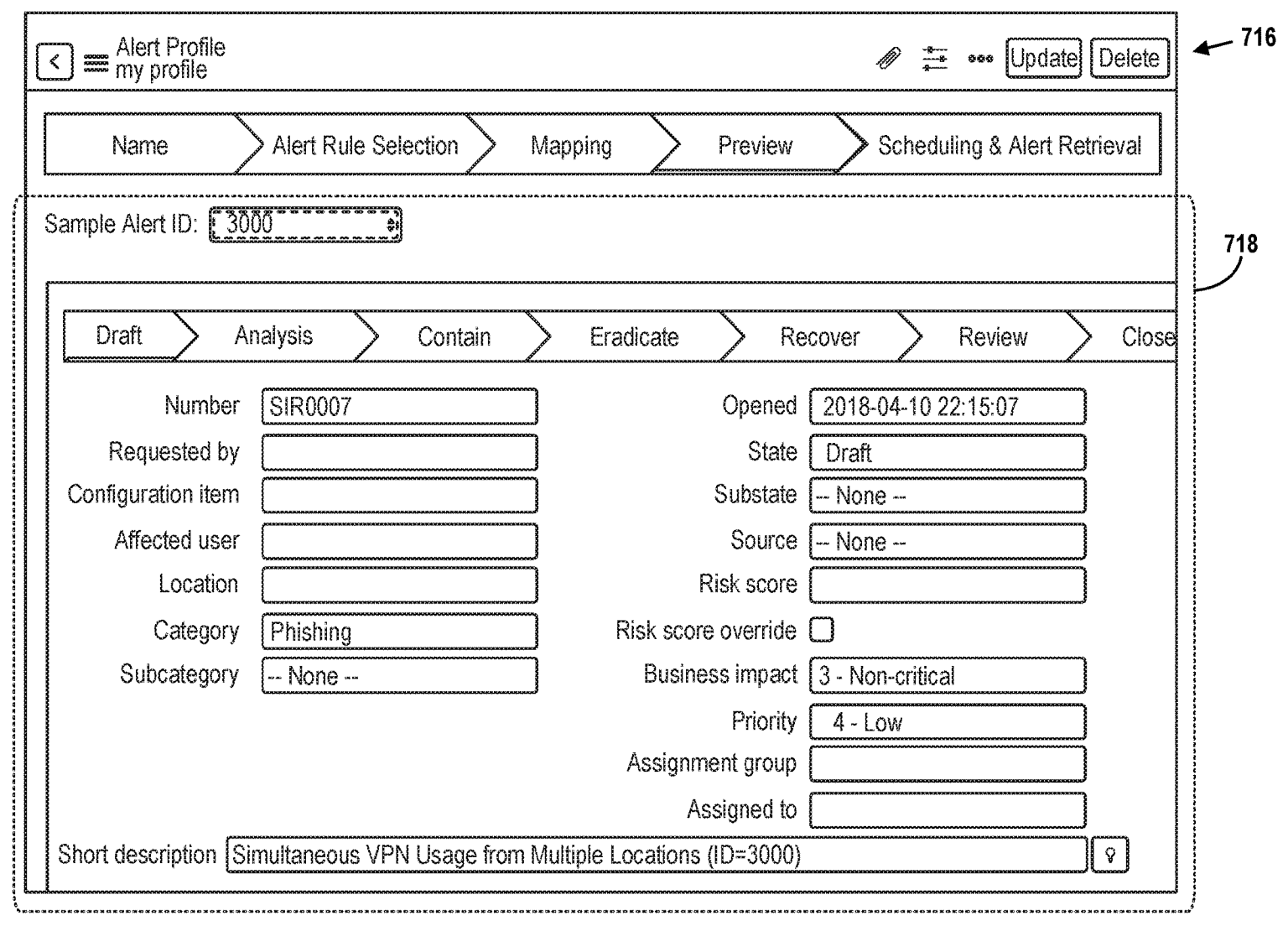

FIG. 7E illustrates an example of such a GUI. In particular, GUI 716 is a fourth step in the multi-step process for creating the alert profile. GUI 716 includes an example form that a preview region might take. Although only preview region 718 is shown in GUI 716, in other implementations, scoped application 600 can provide a GUI that combines the preview region with one or more other regions described herein.

As shown, preview region 718 includes various security incident record fields, such as those described above. Some of these fields include data, whereas others do not, possibly due to the enterprise not creating mapping data that involves those other fields. For example, for one of the past alerts (namely, the past alert with the "AlertID" of 3000), the "AlertRuleName" field may state "Simultaneous VPN Usage from Multiple Locations." Further, the "Input Expression" box that corresponds to the "Short Description" field may include the expression, "$(AlertRuleName) (ID=$(AlertID))." Thus, when scoped application 600 displays a preview of how fields of the past alert will be mapped to security incident record fields, the "Short Description" field at the bottom of preview region 718 includes the following text: "Simultaneous VPN Usage from Multiple Locations (ID=3000)," in accordance with the "Input Expression" box. Ideally, the preview region 718 will indicate to the enterprise whether the enterprise should edit the mapping data or whether the mapping data worked as desired.

Although not shown in FIG. 7E, the GUI page that includes preview region 718 can include, similar to the GUIs discussed above, selectable links for continuing to the next step of the multi-step process for creating the alert profile or for returning to the previous step of the multi-step process. When the "Continue" button is selected, for example, scoped application 600 can generate and provide another GUI (e.g., GUI 720, shown in FIG. 7F) for performing yet another operation of the disclosed process. When the "Previous" button is selected, scoped application 600 can generate and provide the previous GUI, GUI 706 (and GUI 712, if GUI 712 is part of the same GUI page for the third step of the process).

In some implementations, for a given alert profile, scoped application 600 can enable the enterprise to schedule how often scoped application 600 will pull past alerts that were triggered by the set of alert rules, and thereby how often scoped application 600 will create (or update) security incident records that map to those past alerts. To facilitate this, scoped application can provide a GUI that includes a scheduling region. The scheduling region can include a variety of customization options for selecting how often at which to request and receive past alerts from application database 606.

FIG. 7F illustrates an example of such a GUI. In particular, GUI 720 includes scheduling region 722 that can enable the enterprise to select whether to perform a one-time request for past alerts that were triggered by the set of the alert rules specified by the alert profile or rather to perform an iterative request for the past alerts. For example, if the "Historical Alert Retrieval" box is checked, the enterprise may have two one-time request options: (i) request past alerts triggered since a date that can be specified by the enterprise and/or (ii) request specific alerts based on known identifiers of the specific alerts. Further, if the "Ongoing Alert Ingestion Polling" box is checked, the enterprise can select a frequency at which to request and receive the set of the past alerts from application database 606, such as by entering text representing the frequency in a designated box. If a frequency is selected, scoped application 600 can request and receive the set of the past alerts from application database 606 at the selected frequency. As shown, for example, past alerts can be received every five minutes. More particularly, at a first time, a first set of past alerts can be received, and then, at a second time five minutes later (or another period of time later, depending on the selected frequency), a second set of past alerts can be received. In some implementations, the second set of past alerts can include one or more alerts from the first set of past alerts. In other implementations, the second set of past alerts can include only past alerts that were triggered in the time that has elapsed between when the first set of alerts were received and when scoped application 600 attempted to request and receive additional alerts in accordance with the selected frequency.

In some implementations, scoped application 600 can also be configured to facilitate updates to the alerts that correspond to the security incident records. For example, once a past alert has been mapped to a security incident record and the security incident record has been written to the security incident database, scoped application 600 may detect a change in the security incident record and transmit an instruction or other type of message that, upon receipt by third-party application 608, causes third-party application 608 to update application database 606 to reflect the change.

As a more specific example, scoped application 600 can detect that a security incident record in security incident database 602 includes data indicating that a security incident associated with the security incident record has been resolved or cancelled. For example, security incident database 602 can include a table for each security incident record with security incident record fields and corresponding data contained in each field. When the table is changed such that a field for the status of the security incident record is marked as closed, scoped application 600 can determine that the update has occurred. Scoped application 600 can then refer to security incident database 602 to look up an identifier of a past alert from which the security incident record was created. Scoped application 600 can then generate and transmit, either to application database 606 or to third-party application 608, a request to update application database 606 to indicate that the past alert is closed. Third-party application 608, or application database 606 itself, can then update application database 606 to indicate that the past alert is closed. The request can include the identifier of the past alert so that third-party application 608 and/or application database 606 can identify which past alert to update. Other examples are possible as well.

In some implementations, scoped application 600 can be configured to omit creating or updating a security incident record if one or more security incident record fields do not contain values as a result of the mapping. For example, if the enterprise determines, via a sample security incident record, that the priority level field does not contain a value, but still attempts to create a security incident record using the mapping data, scoped application 600 may prevent the security incident record from being created. Other examples are possible as well.

VI. Example Operations

Figure 8:
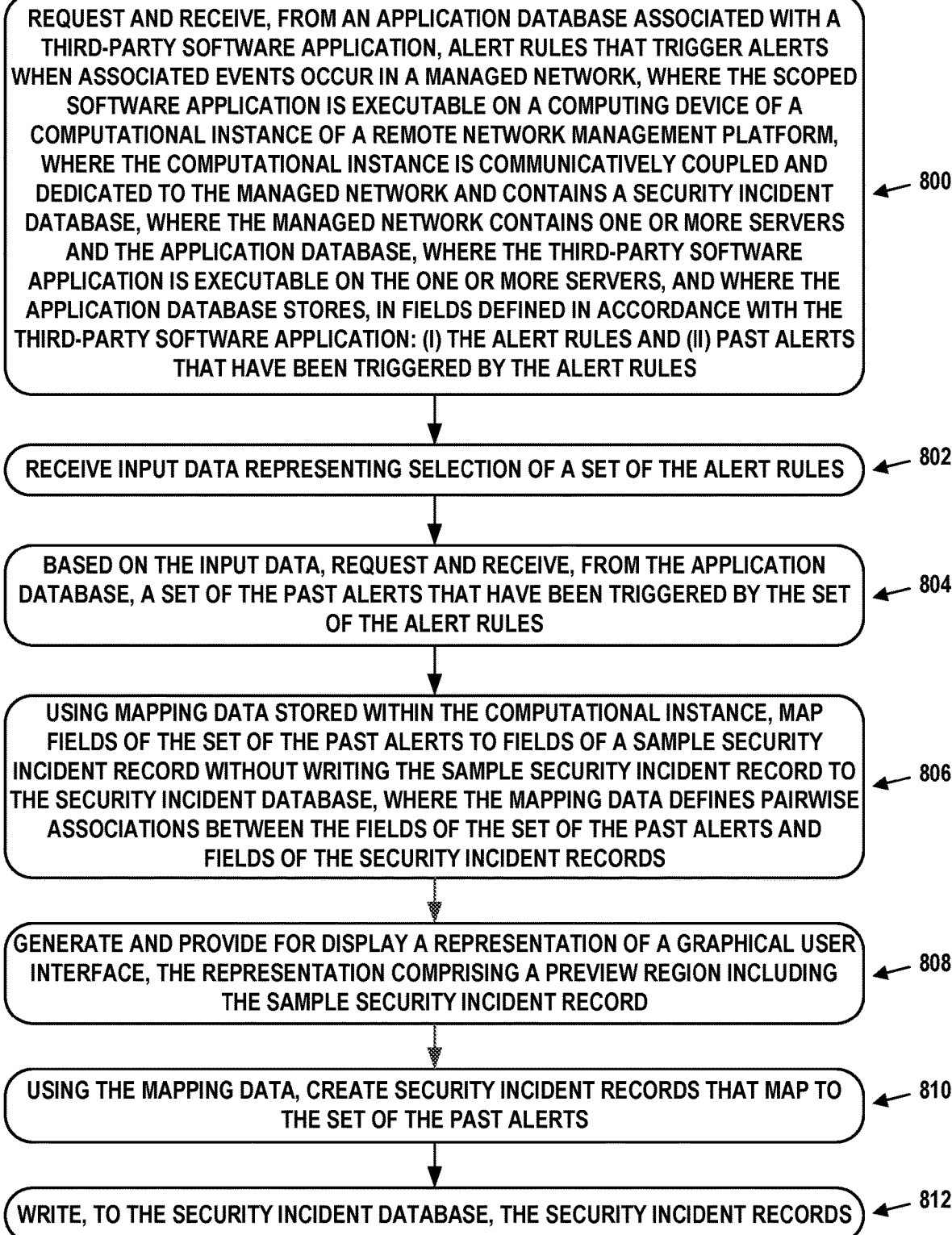
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. For the purposes of example, the process illustrated by FIG. 8 will be described as being carried out by a scoped software application, such as scoped application 600. However, the process can be carried out by other types of devices, applications, or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

In FIG. 8, block 800 involves requesting and receiving, from an application database associated with a third-party software application, alert rules that trigger alerts when associated events occur in a managed network. The scoped software application may be executable on a computing device of a computational instance of a remote network management platform. The computational instance may be communicatively coupled and dedicated to the managed network and may contain a security incident database. The managed network may contain one or more servers and the application database. The third-party software application may be executable on the one or more servers. The application database may store, in fields defined in accordance with the third-party software application: (i) the alert rules and (ii) past alerts that have been triggered by the alert rules.

Block 802 involves receiving input data representing selection of a set of the alert rules.

Block 804 involves, based on the input data, requesting and receiving, from the application database, a set of the past alerts that have been triggered by the set of the alert rules.

Block 806 involves, using mapping data stored within the computational instance, mapping fields of the set of the past alerts to fields of a sample security incident record without writing the sample security incident record to the security incident database. The mapping data may define pairwise associations between the fields of the set of the past alerts and fields of the security incident records.

Block 808 involves generating and providing for display a representation of a graphical user interface, the representation comprising a preview region including the sample security incident record.

Block 810 involves, using the mapping data, creating security incident records that map to the set of the past alerts.

Block 812 involves writing, to the security incident database, the security incident records.

In some embodiments, before using the mapping data to create the security incident records, the scoped software application can generate and provide for display a representation of a graphical user interface. The representation can include an alert rule selection region for enabling the selection of the set of the alert rules. The representation can also include a mapping region for enabling selection of the fields of the set of the past alerts and selection of the fields of the security incident records to which to associate to the fields of the set of the past alerts. The scoped software application can then generate the mapping data based on the selection of the fields of the set of the past alerts and the selection of the fields of the security incident records.

In some embodiments, while providing for display the representation comprising the preview region, the scoped software application can receive second input data representing selection of a link that, when selected, causes the scoped software application to generate and provide for display a second representation of a graphical user interface. The second representation can include a scheduling region for enabling selection of a frequency at which to request and receive the set of the past alerts from the application database. In response to receiving the second input data, the scoped software application can generate and provide for display the second representation comprising the scheduling region. The act of requesting and receiving the set of the past alerts from the application database can thus involve requesting and receiving the set of the past alerts from the application database at the selected frequency.

In some embodiments, before using the mapping data to create the security incident records, the scoped software application can generate and provide for display a representation of a graphical user interface, where the representation includes a filtering rules region for enabling selection of filtering rules. The filtering rules can specify data that, when contained in one or more fields of a past alert, causes the scoped software application to omit creating a security incident record that maps to the past alert. In such embodiments, the act of creating the security incident records can involve creating the security incident records in accordance with the filtering rules.

In some embodiments, the scoped software application can receive input data representing selection of an update to the mapping data. The updated mapping data can include a change in the pairwise associations between the fields of the set of the past alerts and the fields of the security incident records. In such embodiments, the scoped software application can compare an identifier of a past alert of the set of the past alerts to data that is stored in the security incident database, where the data indicates, for each of a plurality of past alerts, whether a corresponding security incident record has previously been created and written to the security incident database for the past alert. Based on the comparison, the scoped software application can determine that a corresponding security incident record has previously been created and written to the security incident data base for the past alert identified by the identifier. The scoped software application can update the corresponding security incident record using the updated mapping data and write the updated security incident record to the security incident database.

In some embodiments, the scoped software application can determine that a security incident record in the security incident database includes data indicating that a security incident associated with the security incident record has been resolved or cancelled. Based on the determination, the scoped software application can refer to the security incident database to determine an identifier of a past alert that is associated with the security incident record. The scoped software application can then generate and transmit, to the application database, a request to update the application database to indicate that the past alert is closed, where the request includes the identifier of the past alert.

In some embodiments, the fields of the set of the past alerts can include, for each past alert of the set of the past alerts, event data representing one or more events that have occurred in the managed network and contributed to triggering the past alert. In such embodiments, the event data for a past alert can include an IP address of each computing device involved in the one or more events and a classification of the past alert.

In some embodiments, the fields of the set of the past alerts can include, for each past alert of the set of the past alerts, one or more of: a time at which the past alert was triggered, an identifier of the past alert, an identifier of an alert rule that triggered the past alert, a status of the past alert, and a severity rating of the past alert.

In some embodiments, the fields of the security incident records can include, for each security incident record of the security incident records, one or more of: a time at which the security incident record was created, an identifier of the security incident record, an identifier of a computing device with which the security incident record is associated, an identifier of a user with which the security incident record is associated, a status of the security incident record, a description of a security incident with which the security incident record is associated, a priority level of the security incident record, a category of the security incident record, and an enterprise impact rating associated with the security incident record.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.
curity incident records.

What is claimed is:

1. A system, comprising:
one or more hardware processors; and
a non-transitory memory storing instructions that, when executed by the one or more hardware processors, cause the one or more hardware processors to perform operations comprising:
generating, for display via a graphical user interface (GUI), a plurality of selectable alert rule features corresponding to a plurality of alert rules associated with a third-party software application;

receiving, via the GUI, a first input indicative of a selection of a particular selectable alert rule feature of the plurality of selectable alert rule features;

generating, for display via the GUI:
- a plurality of past alert icons corresponding to a plurality of alerts, wherein the plurality of alerts have been triggered based on an occurrence of an event as defined by the plurality of alert rules; and
- a plurality of sample security incident records;

receiving, via the GUI, a second input indicative of a selection of a particular past alert icon of the plurality of past alert icons, wherein the particular past alert icon corresponds to a particular past alert associated with the third-party software application;

receiving, via the GUI, a third input indicative of a selection of a particular sample security incident record of the plurality of sample security incident records; and mapping a field of the particular past alert to a field of the particular sample security incident record based on the second input and the third input.

2. The system of claim 1, wherein the operations comprise running a scoped application, and wherein the GUI is generated when a particular permission associated with the scoped application is verified.

3. The system of claim 1, wherein the operations comprise:
creating a security incident record that maps to the particular past alert based on the mapping; and
storing the security incident record in a database.

4. The system of claim 3, wherein the operations comprise receiving, via the GUI, a fourth input indicative of a string used as an identifier for the field of the particular past alert that is mapped to the field of the particular sample security incident record.

5. The system of claim 1, wherein the field of the particular past alert is mapped based on mapping data defining pairwise associations between the field of the particular past alert and the field of the particular sample security incident record.

6. The system of claim 1, wherein the plurality of alerts comprise event data representing one or more events that trigger a respective alert of the plurality of alerts.

7. The system of claim 6, wherein the event data comprises a source IP address, a destination IP address, a hostname, a username, an identifier for an E-mail attachment, a software identifier, a time indication for when the event data was received.

8. The system of claim 1, wherein the GUI comprises a ribbon that comprises a plurality of tabs corresponding to a plurality of respective panes that make up a sequence of panes.

9. The system of claim 8, wherein the operations comprise receiving a toggle input to toggle between the sequence of panes, wherein the ribbon remains on the GUI as the toggle input is received.

10. The system of claim 8, wherein the first input is received via a first pane of the sequence of panes, wherein a first tab of the plurality of tabs is emphasized when the first pane is presented as part of the GUI, and wherein the second input and the third input are received via a second pane of the sequence of panes, wherein a second tab of the plurality of tabs is emphasized when the second pane is presented as part of the GUI.

11. A computer-implemented method, comprising:
generating, for display via a graphical user interface (GUI), a plurality of selectable alert rule features corresponding to a plurality of alert rules associated with a third-party software application;

receiving, via the GUI, a first input indicative of a selection of a particular selectable alert rule feature of the plurality of selectable alert rule features;

generating, for display via the GUI:
- a plurality of past alert icons corresponding to a plurality of alerts, wherein the plurality of alerts have been triggered based on an occurrence of an event as defined by the plurality of alert rules; and
- a plurality of sample security incident records;

receiving, via the GUI, a second input indicative of a selection of a particular past alert icon of the plurality of past alert icons, wherein the particular past alert icon corresponds to a particular past alert associated with the third-party software application;

receiving, via the GUI, a third input indicative of a selection of a particular sample security incident record of the plurality of sample security incident records; and mapping a field of the particular past alert to a field of the particular sample security incident record based on the second input and the third input.

12. The computer-implemented method of claim 11, comprising:
creating a security incident record that maps to the particular past alert based on the mapping; and
storing the security incident record in a database.

13. The computer-implemented method of claim 11, wherein the GUI comprises a ribbon that comprises a plurality of tabs corresponding to a plurality of respective panes that make up a sequence of panes.

14. The computer-implemented method of claim 13, comprising receiving, via the GUI, a toggle input to toggle between the sequence of panes, wherein the ribbon remains on the GUI as the toggle input is received.

15. The computer-implemented method of claim 13, wherein the first input is received via a first pane of the sequence of panes, wherein a first tab of the plurality of tabs is emphasized when the first pane is presented as part of the GUI, and wherein the second input and the third input are received via a second pane of the sequence of panes, wherein a second tab of the plurality of tabs is emphasized when the second pane is presented as part of the GUI.

16. A non-transitory computer-readable medium comprising computer-readable code, that when executed by one or more processors, causes the one or more processors to perform operations comprising:
generating, for display via a graphical user interface (GUI), a plurality of selectable alert rule features corresponding to a plurality of alert rules associated with a third-party software application;

receiving, via the GUI, a first input indicative of a selection of a particular selectable alert rule feature of the plurality of selectable alert rule features;

generating, for display via the GUI:
- a plurality of past alert icons corresponding to a plurality of alerts, wherein the plurality of alerts have been triggered based on an occurrence of an event as defined by the plurality of alert rules; and
- a plurality of sample security incident records;

receiving, via the GUI, a second input indicative of a selection of a particular past alert icon of the plurality of past alert icons, wherein the particular past alert icon corresponds to a particular past alert associated with the third-party software application;

receiving, via the GUI, a third input indicative of a selection of a particular sample security incident record of the plurality of sample security incident records; and mapping a field of the particular past alert to a field of the particular sample security incident record based on the second input and the third input.

17. The non-transitory computer-readable medium of claim 16, wherein the operations comprise:

receiving, via the GUI, a fourth input indicative of a string used as an identifier for the field of the particular past alert that is mapped to the field of the particular sample security incident record;

creating a security incident record that map to the particular past alert based on the mapping and the fourth input indicative of the string used as the identifier; and storing the security incident record in a database based on the identifier.

18. The non-transitory computer-readable medium of claim 16, wherein the GUI comprises a ribbon that comprises a plurality of tabs corresponding to a plurality of respective panes that make up a sequence of panes.

19. The non-transitory computer-readable medium of claim 18, wherein the operations comprise receiving a toggle input to toggle between the sequence of panes, wherein the ribbon remains on the GUI as the toggle input is received.

20. The non-transitory computer-readable medium of claim 19, wherein the first input is received via a first pane of the sequence of panes, wherein a first tab of the plurality of tabs is emphasized when the first pane is presented as part of the GUI, and wherein the second input and the third input are received via a second pane of the sequence of panes, wherein a second tab of the plurality of tabs is emphasized when the second pane is presented as part of the GUI.

* * * * *